US007917765B2

(12) United States Patent
Cramb

(10) Patent No.: US 7,917,765 B2
(45) Date of Patent: Mar. 29, 2011

(54) MODULAR SIGNATURE VERIFICATION ARCHITECTURE

(75) Inventor: Jamie D. Cramb, Dundee (GB)

(73) Assignee: NCR Corporation, Duluth, GA (US)

( * ) Notice: Subject to any disclaimer, the term of this patent is extended or adjusted under 35 U.S.C. 154(b) by 950 days.

(21) Appl. No.: 11/809,106

(22) Filed: May 31, 2007

(65) Prior Publication Data

US 2008/0301450 A1    Dec. 4, 2008

(51) Int. Cl.
*H04L 9/32* (2006.01)
(52) U.S. Cl. ........................................ 713/176
(58) Field of Classification Search .................. 713/176, 713/180, 168; 726/2; 380/277
See application file for complete search history.

(56) References Cited

U.S. PATENT DOCUMENTS 7,152,158 B2 * 12/2006 Watanabe et al. ............. 713/156
7,370,206 B1 * 5/2008 Goldman ...................... 713/176

* cited by examiner

*Primary Examiner* — Michael Pyzocha
*Assistant Examiner* — Ali S Abyaneh
(74) *Attorney, Agent, or Firm* — Paul W. Martin

(57) ABSTRACT

It is difficult to provide a mechanism that is able to verify electronic signatures of different types in a simple and cost-effective manner. This is achieved by using a signature verification engine with an interface enabling signature modules to be removably plugged in. Each signature module has information about a particular signature type and functionality for verifying signatures of that type. The signature verification engine receives requests to verify signatures. It identifies a suitable signature module and works with that module to verify the signature. An enterprise who acquires equipment incorporating the signature verification engine is able to plug in its own signature module giving versatility whilst retaining security.

13 Claims, 4 Drawing Sheets

MODULAR SIGNATURE VERIFICATION ARCHITECTURE

BACKGROUND

Digital signature schemes are known whereby cryptographic techniques are used to simulate the security properties of a signature in digital, rather than written form. Such signature schemes may be used to authenticate messages, to ensure that messages are not altered during transmission and also to reduce the likelihood that a sender will later disclaim responsibility for a message sent by that sender.

Electronic signature schemes are also known which do not necessarily use cryptographic techniques. In this case, an electronic sound, symbol, or process, is attached to or logically associated with a record and executed or adopted by an agent with the intent to sign the record. For example, such electronic signatures may include faxed copies of handwritten signatures, personal identification numbers (PIN numbers), and online signature of electronic documents.

A digital signature is considered an example of a type of electronic signature.

For all these types of signature schemes a verification process is required to enable receivers to check whether the signature was generated by the alleged sender and optionally also to check whether a message associated with the signature has been altered after signing. However, depending on the particular signature scheme being used this signature verification process differs. It is difficult to provide a mechanism that is able to verify electronic signatures of different types in a simple and cost-effective manner.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

It is difficult to provide a mechanism that is able to verify electronic signatures of different types in a simple and cost-effective manner. This is achieved by using a signature verification engine with an interface enabling signature modules to be removably plugged in. Each signature module has information about a particular signature type and functionality for verifying signatures of that type. The signature verification engine receives requests to verify signatures. It identifies a suitable signature module and works with that module to verify the signature. An enterprise who acquires equipment incorporating the signature verification engine is able to plug in its own signature module giving versatility whilst retaining security.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

It is difficult to provide a mechanism that is able to verify electronic signatures of different types in a simple and cost-effective manner.

Figure 1:
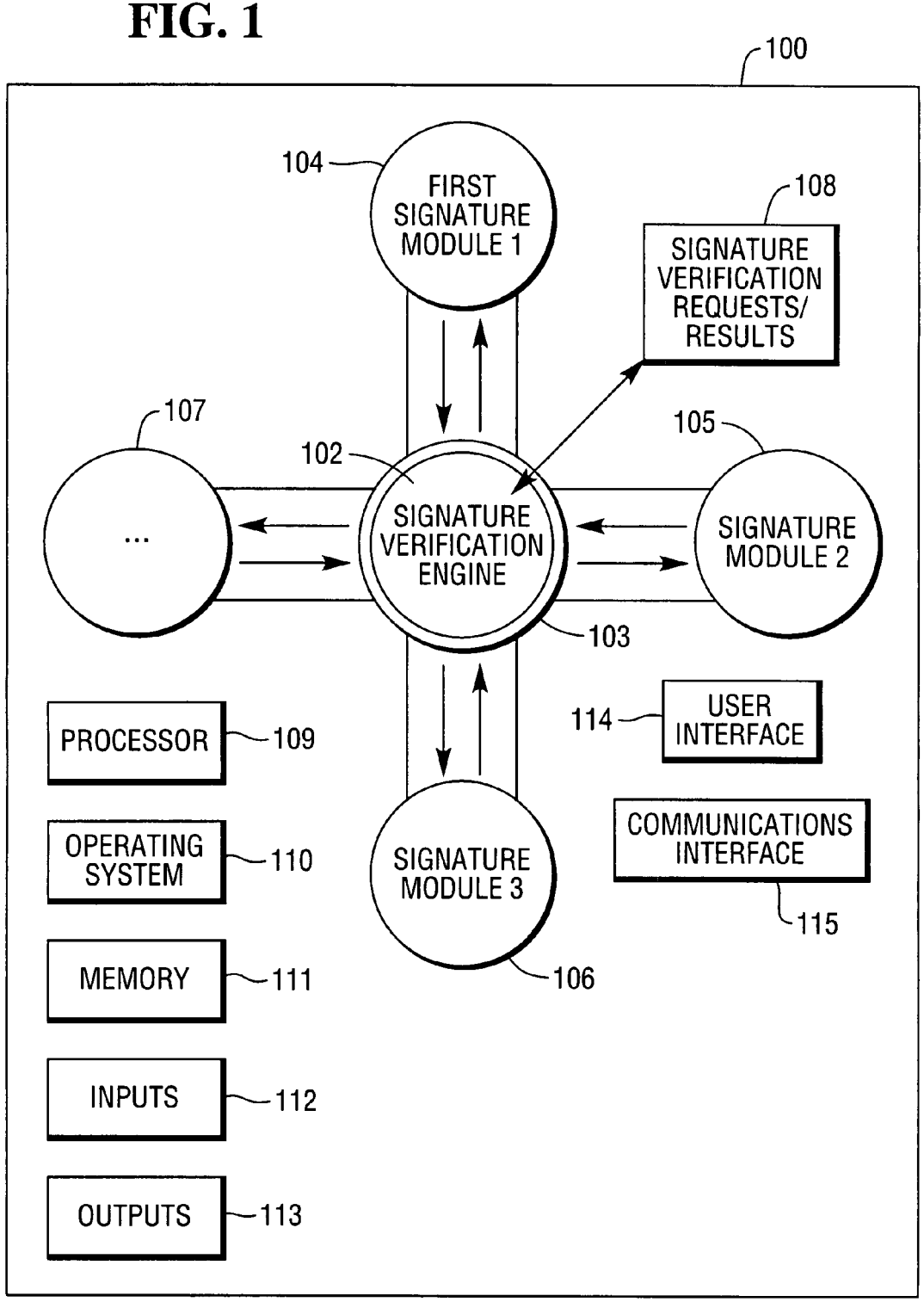
FIG. 1 is a schematic diagram of a signature verification engine incorporated in a computer and in communication with signature modules.

FIG. 1 is a schematic diagram of an electronic-signature verification engine 102 which in this example is incorporated in a computer 100 which may be of any suitable type. The verification engine 102 comprises an interface 103 which enables one or more signature modules 104, 105, 106, 107 to be plugged into the verification engine in a removable manner and without the need to reconfigure the signature modules or the verification engine 102.

The verification engine also comprises a processor 109 which may be provided as part of the computer 100 that the verification engine is part of. Also, the verification engine has an input for receiving signature verification requests 108 and an output for issuing signature verification results.

A given signature module comprises information about a particular signature type and functionality for verifying signatures of that type. Any suitable digital or electronic signature scheme may be used.

One of the signature modules, referred to as a first signature module 104 is preconfigured and provided with the signature verification engine during installation or configuration of the computer 100 by an operator or remote agent. This first signature module comprises information about a signature type of a signing authority.

Each of the other signature modules is itself signed by the signing authority. That is, each of the other signature modules comprises a signature of the first signature module type.

The computer 100 may be implemented as any form of a computing and/or electronic device, and in which embodiments of the signature verification engine may be implemented. It comprises one or more inputs 112 and outputs 113 which are of any suitable type. The computer also optionally comprises communications interface 115.

One or more processors 109 are provided which may be microprocessors, controllers or any other suitable type of processors for processing computing executable instructions to control the operation of the apparatus in order to verify signatures. Platform software comprising an operating system 110 or any other suitable platform software may be provided at the computing-based device to enable software to be executed on the device.

The computer executable instructions may be provided using any computer-readable media, such as memory 111. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

The output 113 may be an audio and/or video output to a display system integral with or in communication with the computing-based device. The display system may provide a graphical user interface 114, or other user interface of any suitable type although this is not essential.

The signature verification engine 102 may be arranged to hook into or connect to the operating system 110 in order to trap requests for an application to launch and potentially block that application if it does not have a valid signature.

Figure 2:
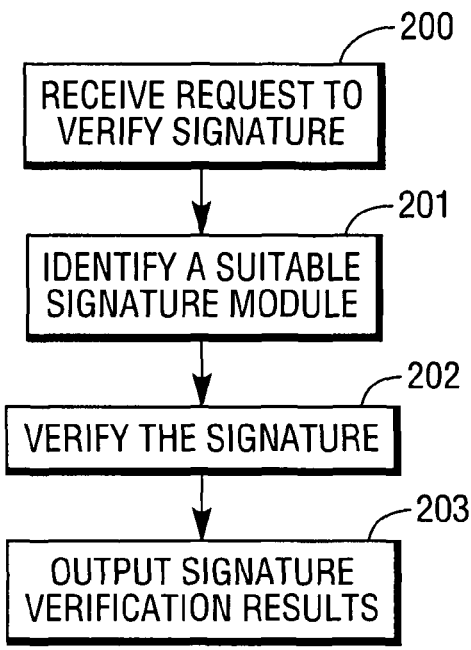
FIG. 2 is a flow diagram of an example method of verifying a signature using a signature verification module.

FIG. 2 is a flow diagram of an example method of verifying a signature using a signature verification engine such as that of FIG. 1. The signature verification engine receives (block 200) a request 108 to verify a signature. This signature is of a particular type which may be any of a plurality of types. The signature verification engine identifies (block 201) a signature module which has information about the required signature type. This is achieved in any suitable manner. For example, by querying available signature modules which are plugged into the interface 103 and whose signatures have been verified. Alternatively, the signature verification engine may have stored information about which signature modules relate to which signature types or may be able to access this information from elsewhere.

The identified signature module is then used to verify the signature (block 202). The signature verification engine sends a request to the identified signature module to find out whether the signature is valid. The signature module sends the results back to the signature verification engine. The signature verification module then outputs the signature verification results (block 203).

Figure 3:
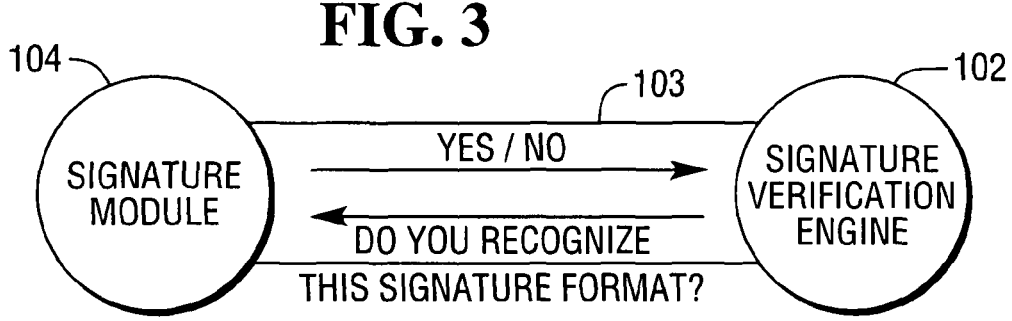
FIG. 3 is a schematic diagram of a method of identifying a suitable signature module.

FIG. 3 illustrates an interaction between the signature verification module 102 and a signature module 104 during an example process of identifying a suitable signature module. A message is sent to the signature module asking whether it recognizes the signature format and the signature module sends a yes/no answer in reply. These messages are sent using any suitable protocol and using the interface 103.

Figure 4:
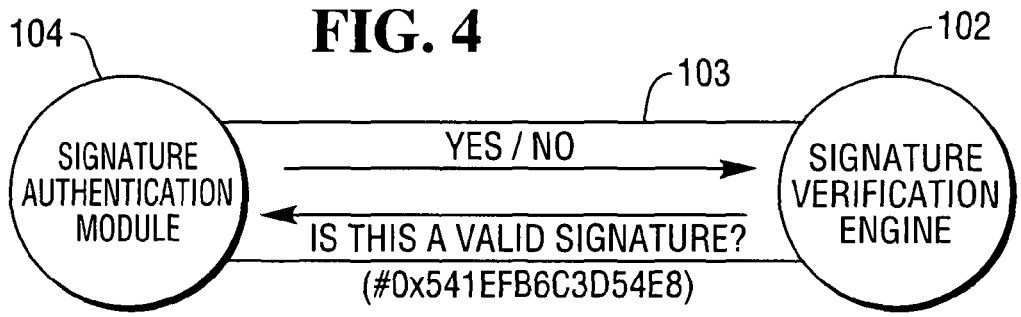
FIG. 4 is a schematic diagram of a method of verifying a signature.

FIG. 4 illustrates an interaction between the signature verification module 102 and a signature module 104 during an example process of signature verification. A message is sent to the signature module sending a signature and asking whether it is valid. The signature module replies with a yes/no answer. These messages are sent using any suitable protocol and using the interface 103. In other examples, more of the signature verification functionality may be provided at the signature verification engine.

Figure 5:
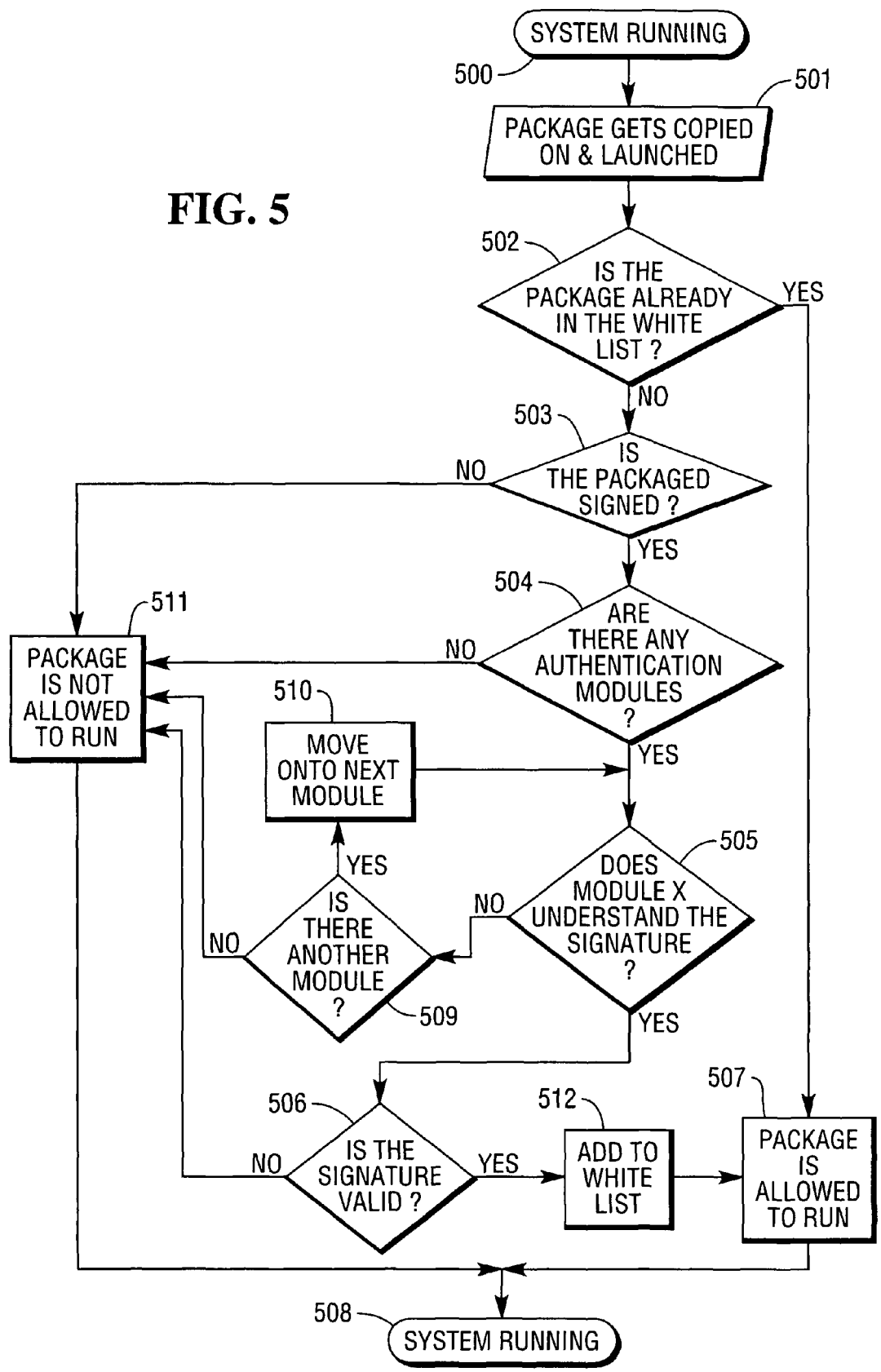
FIG. 5 is a flow diagram of an example method of enabling a package to execute on a processor.

FIG. 5 is a flow diagram of an example method of signature verification. In this example, signed packages are received at the computer 100 and comprise executable code for execution of the computer 100. It is required to ensure that the signatures are valid before allowing the code to be executed. The signed packages may be received from a plurality of different sources and have signatures of different types created using different types of electronic or digital signature schemes.

The computer 100 or system is running (block 500) and a package is copied onto the computer (block 501) and launched. The signature verification engine makes an optional check as to whether the package is on a pre-specified white list (block 502) of packages that are allowed to execute without signature verification. If so, the package is allowed to run (block 507). If not, a check is made by the engine as to whether the package is electronically or digitally signed (block 503). If not the package is not allowed to run (block 511). If the package is signed the signature verification engine checks whether any signature modules are plugged in and available for use (block 504). If not, the package is not allowed to run (block 511). Otherwise the signature verification engine tries to find a signature module which understands the given signature (block 505). This is done by querying available signature modules in turn (blocks 509, 510). If no suitable signature module is found the package is not allowed to run (block 511). If a suitable signature module is found the signature verification engine sends the signature to that module and asks for verification of that signature (block 506). If verification is successful the package is allowed to run (block 507) otherwise the package is not allowed to run (block 511). In the case that white list is being used as described above with reference to block 502 then details about the package are added to the white list (block 512) in the event that the signature is valid (block 506).

Figure 6:
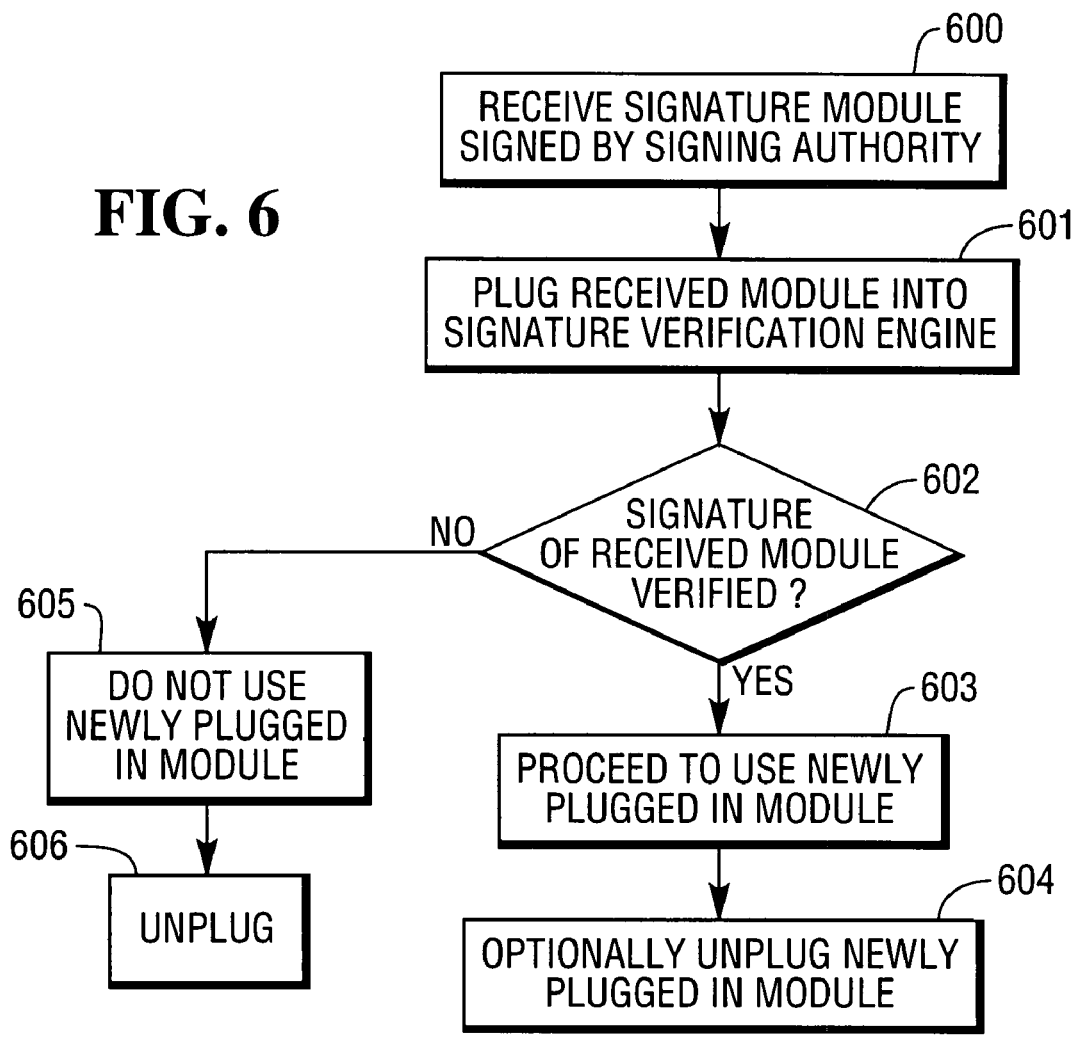
FIG. 6 is a flow diagram of a method of plugging in a signature module.

FIG. 6 is a flow diagram of a method of plugging or unplugging signature modules. A signature module is received (block 600) at the signature verification engine, that signature module having been signed by a signing authority. The received module is then plugged (601) into the signature verification engine using the interface 103. An attempt is then made to verify the signature of this received module (block 602). For example, the signature verification engine comprises a first signature module which is preconfigured and which comprises information about a signature type of the signing authority. Using the methods described above, the signature of the received module may be verified using the preconfigured first signature module. If this process is successful the newly received signature module is activated for use (block 603). Otherwise the newly received signature module is not used and may be unplugged (blocks 605 and 606). It is also possible to unplug signature modules that are already in use (block 604).

In some examples, the computer 100 may be provided by a particular supplier. If an enterprise uses the computer 100 it is able to plug in its preferred signature module to enable the enterprise to use the computer 100 in conjunction with its preferred signature scheme which may be proprietary to that enterprise. This is achieved in a simple, fast and cost effective manner whilst retaining a high degree of security. For example the supplier may provide details of an application programming interface of the signature verification engine to the enterprise. The enterprise is then able to develop its own signature verification module for use with the computer 100.

Although a central signing authority may be used to sign signature modules it is not necessary to provide a central signing authority for signing each package or other message received under the signature scheme. This reduces overheads and complexity.

In some examples the computer 100 is integral with a self-service apparatus such as a self-service kiosk, automated teller machine (ATM), automated cash deposit machine or the like. Such self-service apparatus is often left unattended for long periods of time. By using the signing mechanisms described herein, software patches and upgrades may be uploaded to the apparatus in a secure manner.

In some examples, if verification of either a new authentication module or a signed package fails then an action is taken to log that event on the system 100. This is achieved using system event logs at the computer 100 or in any other suitable manner. Other events in the methods of FIGS. 5 and 6 may also be logged.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

The steps of the methods described herein may be carried out in any suitable order, or simultaneously where appropriate.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

What is claimed is:

1. An electronic-signature verification computer comprising:
   an input arranged to receive requests to verify signatures of a plurality of different types;
   a plurality of signature verification modules, wherein each signature verification module has information about a signature type unique to the signature module and each signature module is for verifying only signatures of the signature type;
   wherein the plurality of signature verification modules includes a first signature verification module having information about a first signature type unique to the first signature verification module, and wherein other signature verification modules are signed by a signature of the first signature type;
   a single interface arranged to communicate with each of the plurality of signature modules in order to access the information about the signature type from each of the signature verification modules;
   wherein the interface and the signature verification modules are arranged such that the signature verification modules are removably connected to the interface;
   a microprocessor arranged to verify signatures using the information accessed from the signature verification modules via the interface; and
   an output arranged to output signature verification results.

2. An electronic-signature verification computer as claimed in claim 1 wherein the first signature verification module is preconfigured as part of the computer by a signing authority.

3. An electronic-signature verification computer as claimed in claim 1 which is incorporated into a self-service apparatus.

4. A method comprising:
   receiving by an electronic-signature verification computer a request to verify a signature of a particular type which is one of a plurality of different signature types;
   accessing via a single interface a plurality of signature verification modules;
   arranging the interface and the signature verification modules such that the signature verification modules are removably connected to the interface;
   wherein each signature verification module has information about a signature type unique to the signature module and each signature module is for verifying only signatures of the signature type;
   wherein the plurality of signature verification modules includes a first signature verification module having information about a first signature type unique to the first signature verification module, and wherein other signature verification modules are signed by a signature of the first signature type;
   identifying by the computer one of the signature verification modules which comprises information about the particular signature type;
   communicating by the computer with the identified signature module in order to verify the signature; and
   outputting by the computer signature verification results.

5. A method as claimed in claim 4 which further comprises ensuring that the first signature verification module is preconfigured by a signing authority.

6. A method as claimed in claim 4 wherein the request to verify a signature relates to a piece of executable code associated with that signature and wherein if that signature is successfully verified, the method further comprises allowing that piece of executable code to execute on a processor associated with the electronic-signature verification engine.

7. A method as claimed in claim 4 wherein the process of identifying a signature verification module comprises accessing available signature modules beginning with the first signature verification module.

8. A method comprising:
  providing a signature verification module interface for an electronic signature verification computer;
  providing a preconfigured signature verification module comprising information about a first signature type of a signing authority for the electronic signature verification computer;
  receiving by the electronic signature verification computer a second signature verification module having a second signature and comprising information about a second signature type different from the first signature type;
  arranging the interface and the second signature verification module such that the second signature verification module is removably connected to the interface;
  connecting by the electronic signature verification computer the second signature verification module to the signature verification module interface;
  verifying by the electronic signature verification computer the second signature of the second signature verification module using information about the first signature type; and
  proceeding by the electronic signature verification computer to use the second signature verification module only if the second signature verification is successful.

9. A method as claimed in claim 8 which further comprises receiving a third signature verification module having a third signature and comprising information about a third signature type different from the first and second signature types by the electronic signature verification computer, connecting the third signature verification module to the signature verification module interface by the electronic signature verification computer, verifying the third signature of the third signature module using information about the first signature type by the electronic signature verification computer, and proceeding to use the third signature verification module by the electronic signature verification computer only if the third signature verification is successful.

10. A method as claimed in claim 9 which further comprises disconnecting either of the second and third signature verification modules from the interface by the electronic signature verification computer.

11. A method as claimed in claim 9 which further comprises arranging the signature verification modules to store information about signature type and to provide functionality for verifying signatures of that type.

12. A method as claimed in claim 9 which further comprises arranging the interface and the signature verification modules such that connecting and disconnecting the signature verification modules to the interface requires no reconfiguration of the interface and signature verification modules.

13. A method as claimed in claim 9 which comprises incorporating the electronic-signature verification computer into a self-service apparatus.

* * * * *